(12) United States Patent
Hsieh

(10) Patent No.: US 8,905,232 B2
(45) Date of Patent: Dec. 9, 2014

(54) PROTECTIVE CASE

(71) Applicants: Keystones Intellectual Property Management Co., Ltd., Taipei (TW); Cang Fu International Industry Corporation, Taipei (TW)

(72) Inventor: Ding-Rong Hsieh, Taipei (TW)

(73) Assignees: Keystones Intellectual Property Management Co., Ltd., Taipei (TW); Dong-Rong Hsieh, Taipei (TW)

( * ) Notice: Subject to any disclaimer, the term of this patent is extended or adjusted under 35 U.S.C. 154(b) by 0 days.

(21) Appl. No.: 13/932,002

(22) Filed: Jun. 30, 2013

(65) Prior Publication Data

US 2014/0190844 A1 Jul. 10, 2014

(30) Foreign Application Priority Data

Jan. 10, 2013 (TW) .............................. 102200564 U

(51) Int. Cl.
*B65D 85/00* (2006.01)
*G06F 1/16* (2006.01)

(52) U.S. Cl.
CPC .................................. *G06F 1/1624* (2013.01)
USPC ......................................................... 206/320

(58) Field of Classification Search
USPC .................... 206/576, 320, 1.5, 701, 722, 724
See application file for complete search history.

(56) References Cited

U.S. PATENT DOCUMENTS

| 6,561,349 | B2 * | 5/2003 | Lee ................ | 206/320 |
| 6,654,235 | B2 * | 11/2003 | Imsand ..................... | 361/679.09 |
| 8,567,600 | B2 * | 10/2013 | Fan ................ | 206/320 |
| 8,607,976 | B2 * | 12/2013 | Wu et al. ........................ | 206/320 |
| 2004/0150628 | A1 * | 8/2004 | Huang et al. ................... | 345/173 |
| 2011/0297581 | A1 * | 12/2011 | Angel ............................ | 206/736 |
| 2012/0138493 | A1 * | 6/2012 | Tung-Ke ....................... | 206/320 |
| 2014/0197058 | A1 * | 7/2014 | Huet et al. ..................... | 206/320 |

* cited by examiner

*Primary Examiner* — Jacob K Ackun
(74) *Attorney, Agent, or Firm* — Cheng-Ju Chiang

(57) ABSTRACT

A protective case comprises a front case, a baffle, at least one fastening, and a baseplate. A mobile device can be installed into the front case. When the front case is combined with the at least one fastening as pivots, the front case may be slid and turned over in sliding tracks of the baseplate so that a screen of the mobile device can be protected.

10 Claims, 4 Drawing Sheets

PROTECTIVE CASE

BACKGROUND OF THE INVENTION

1. Filed of the Invention

This present invention relates to a protective case comprising a front case, more particularly to the protective case for a mobile device to be installed into and turned over with the front case.

2. Description of the Related Prior Art

Portable devices, such as smartphones and tablet computers, have become a necessity for personal digital assistance, entertainment and information providing in the present day. Additionally, wireless network is widely distributed in Taiwan main cities making it easy to surf internet in daily life. As a result, the smart phones with a plurality of functions, such as surfing internet, playing games, reading e-books or seeing videos, provide common entertainment for people on a bus or in a metro system.

The values and features of an extremely expensive smartphone which users are willing to spend on or would pay attention to are high-speed processing, fluent operation, figure design and related accessories. Besides, protection for the smartphones is an important detail the users are prone to care about as well. The smartphones are usually put in a pocket, a purse or on a desk where the smartphones can be easily reached. However, the smart phones may easily drop in heavy traffic or in a crowded place or get a scratch caused by hard or sharp things, such as coins or keys, when put in the purse. The dropping or the scratch may damage a case or a screen of the smartphones. Situations mentioned above may cost a great deal of maintenance expense.

Related prior arts have provided many ways to protect different models of expensive portable devices, for instance, adhesive film wrapping, leather cover covering or hard shell installing; moreover, fashion, artistry and personal style are also essential factors for protection of the portable devices. Though the adhesive film wrapping, scratch-resistance of the screen can be improved, but the adhesive film may peel off as time goes by, and an extra expense for replacing a new film might occur. The hard shell made from plastic or metal can improve pressure-resistance. The hard shell can be divided into two shells; one may be made from a stiff material, the other may be made from a soft material which can be a transparent plastic membrane. Likewise, the transparent plastic membrane may lack the pressure-resistance and turn yellow making the screen unidentifiable as time goes by. When utilizing the leather cover covering, to unlock a buckle and to lift a leather cover seem to be inconvenient and lack the pressure-resistance. For the time being, the related prior arts fail to provide the scratch-resistance and the pressure-resistance at the same time.

The present invention proposes a protective case which can solve the defects stated above by providing better scratch-resistance and better pressure-resistance at the same time without affording additional expenses for multiple replacements.

SUMMARY OF THE INVENTION

The invention proposes a protective case for a mobile device to be installed into and turned over so that a screen or a back of the mobile device can be faced a user. Thus and so, the screen of the mobile device can be protected, and the drawbacks stated in the description of the related prior art can be solved.

The protective case comprises a front case, a baffle, a baseplate and at least one fastening. The front case is well-fitted and covered only circumference of the mobile device, the screen, the back, a front lens and a back lens of the mobile device are remained uncovered. The front case comprises a first top and a first bottom; moreover, at least one side of the front case is further provided with at least one first orifice. A rail used for combining the baffle and the front case is set at a bottom surface of the first bottom.

The baffle comprises a convex rail and a third orifice. As the mobile device is installed into the front case, the baffle can be combined with the front case through the convex rail matched with the rail. As the baffle inserts and combines the front case, the at least one fastening can lock the baffle and the front case together; another at least one fastening set at a top surface of the first top opposite to the at least one fastening set at the first bottom is combined with the front case. The at least one fastening can be used for fixing the baffle with the front case and being pivots for the front case to be turned over.

The baseplate comprises a second top being sealed and a second bottom being unsealed. A space formed by the second top and the second bottom is suitable for the front case to be combined with. A sliding track is respectively set at the second top and the second bottom, and a space surrounded by the sliding track is suitable for the at least one fastening to be put into and slid in. As the at least one fastening is combined with the first top and the first bottom of the front case and the at least one fastening is put into the sliding track, the front case can be combined with the baseplate. When the front case is combined with the at least one fastening as pivots, the front case can be slid and turned over in sliding tracks of the baseplate. Through being turned over, a screen or a back of the mobile device can be faced the user. A first fastener is respectively set at the top surface of the first top and the bottom surface of the first bottom of the front case, and at least one second fastener is respectively set at a bottom surface of the second top and a top surface of the second bottom. Through the first fastener and the at least one second fastener being correspondingly engaged, the mobile device installed into the front case can be in a stationary state when the screen or the back of the mobile device is faced the user. The front case can be turned over by separating the first fastener and the at least one second fastener while lightly pulling the front case. The baseplate is provided with a second orifice as an opening for a lens. When the screen of the mobile device is faced the user, the lens remains uncovered on account that the second orifice as the opening.

The mobile device can be turned over with the front case. When the back of the mobile device is faced the user, the screen of the mobile device is faced the baseplate so that the screen can be protected from a scratch of sharp things. Besides, the front case and the baseplate are provided with a color, a pattern, an ornament or the combination thereof for the user to choose at will.

DETAILED DESCRIPTION OF THE INVENTION

Hereinafter, embodiments of the invention will be explained in detail with reference to the drawings; however, the invention is not limited thereto.

Figure 1:
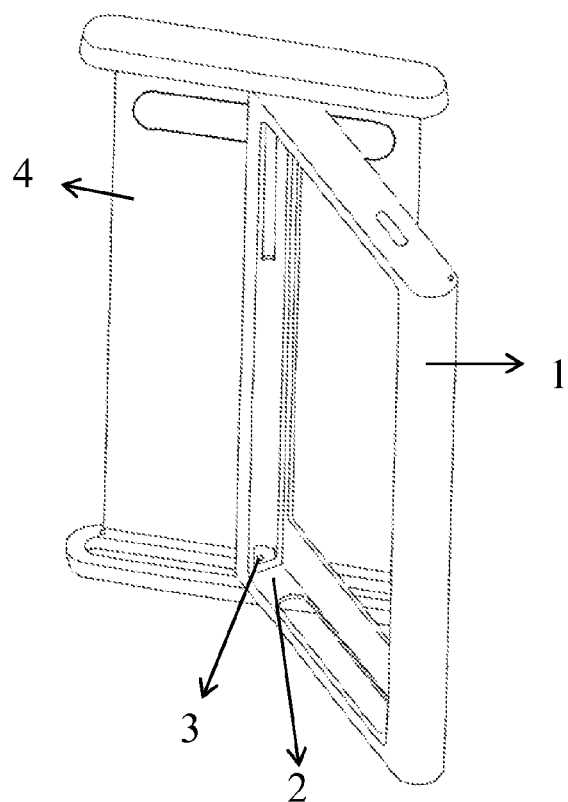
FIG. 1 illustrates a perspective view of the present invention.

Referring to FIG. 1, the invention comprises a front case 1, a baseplate 4 and a baffle 2. Through the combination of the front case 1 and at least one fastening 3, the front case 1 can be further combined with the baseplate 4.

Figure 2:
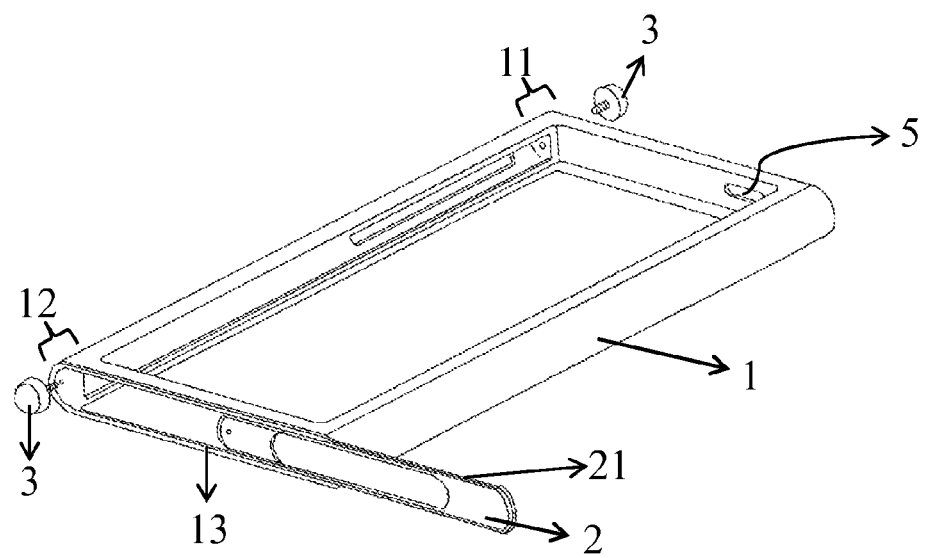
FIG. 2 illustrates a perspective view of a front case of the present invention.
Figure 3:
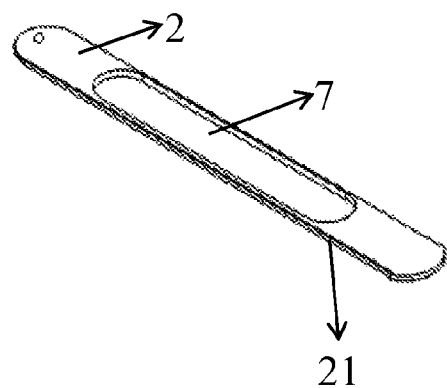
FIG. 3 illustrates a perspective view of a baffle of the present invention.

Referring to FIG. 2, the front case 1 for a mobile device to be installed into in one preferred embodiment is a rectangular figure. The figure of the front case 1 can be varied corresponding to various shapes of the mobile device, such as an oval-shaped figure or a ladder-shaped figure. The front case 1 comprises a first top 11, a first bottom 12, the at least one fastening 3 and a rail 13 set at the first bottom 12, wherein the rail 13 can be combined with the baffle 2. Referring to FIG. 2 and FIG. 3, the baffle 2 in one preferred embodiment is a flat-plate structure. The baffle 2 comprises a convex rail 21 matched with the rail 13 set at the first bottom 12 and combined with the front case 1. As the baffle 2 inserts and combines a bottom surface of the first bottom 12, the at least one fastening 3 can lock the baffle 2 and the first bottom 12 together; another at least one fastening 3 set at a top surface of the first top 11 opposite to the at least one fastening 3 set at the first bottom 12 is combined with the front case 1. The at least one fastening 3 can be used for fastening the baffle 2, combining with the front case 1 and being pivots for the front case 1 to be turned over. The top surface of the first top 11 is provided with at least one first orifice 5 as an opening for a button, a user can press the button through the at least one first orifice 5. Referring to FIG. 3, the baffle 2 is provided with a third orifice 7 as an opening for a connector which is used for a wire.

Figure 4:
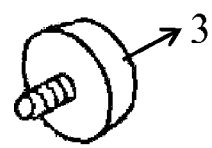
FIG. 4 illustrates a perspective view of at least one fastening of the present invention.
Figure 5:
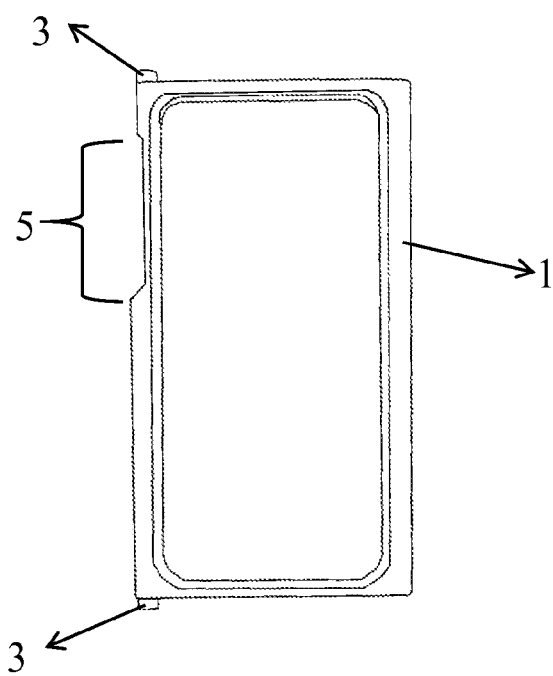
FIG. 5 illustrates a schematic diagram illustrating the combination of the front case and the at least one fastening.
Figure 6:
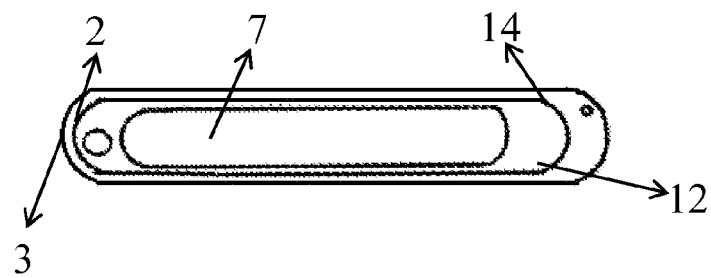
FIG. 6 illustrates a bottom view illustrating the combination of the baffle and a first top.

Referring to FIG. 4, the at least one fastening 3 in one preferred embodiment can be a screw or a rivet provided with a color, a pattern, an ornament, or the combination thereof. Referring to FIG. 5, the at least one fastening 3 is combined with the front case 1, and the front case 1 is provided with a space for the mobile device to be installed into and fixed. Referring to FIG. 6, the baffle 2 provided with the third orifice 7 is combined with the first bottom 12 through the at least one fastening 3, wherein a first fastener 14 is set at the bottom surface of the first bottom 12, the first fastener 14 can be a protrusion, a dent or a magnet.

Figure 7:
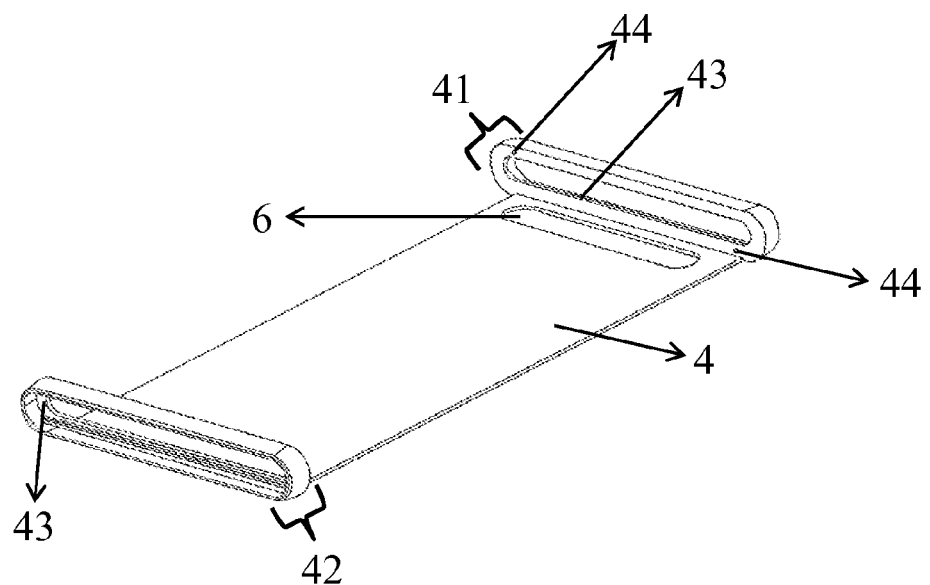
FIG. 7 illustrates a perspective view of a baseplate of the present invention.

Referring to FIG. 7, the baseplate 4 in one preferred embodiment is a rectangular figure comprising a second top 41 being sealed and a second bottom 42 being unsealed. A space formed by the second top 41 and the second bottom 42 is suitable for the front case 1 to be combined with. A sliding track 43 is respectively set at the second top 41 and the second bottom 42, and a space surrounded by the sliding track 43 is suitable for the at least one fastening 3 to be put into and slid in. At least one second fastener 44 is set at a bottom surface of the second top 41, the at least one second fastener 44 can be a protrusion, a dent or a magnet. The baseplate 4 is further provided with a second orifice 6 as an opening for a lens.

Figure 8A:
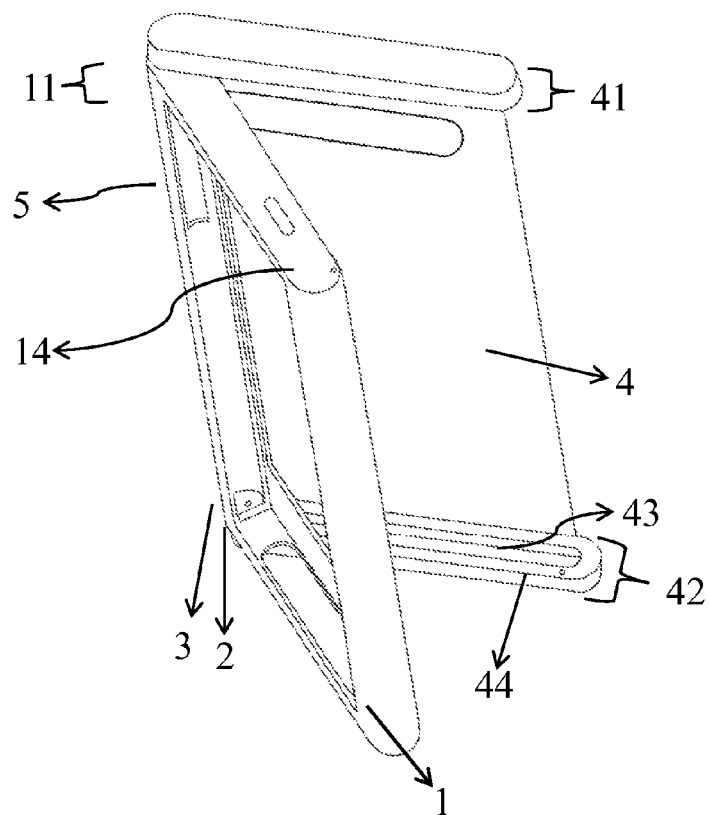
FIG. 8A illustrates a schematic diagram illustrating the front case being turned over.
Figure 8B:
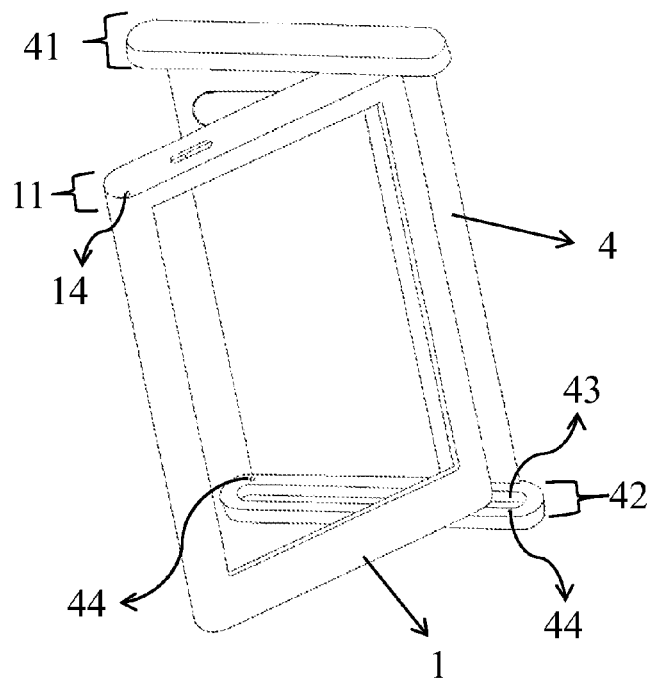
FIG. 8B illustrates another schematic diagram illustrating the front case being turned over.

Referring to FIG. 8A and FIG. 8B, the front case 1 is combined with the baseplate 4 through the at least one fastening 3. By disengaging the first fastener 14 and the at least one second fastener 44, the at least one fastening 3 as the pivots and in one side of the sliding track 43, the front case 1 can be slid toward another side of the sliding track 43 and turned over. By turning the front case 1 over, the mobile device can be turned over and the screen of the mobile device can be protected as the screen is faced the baseplate 4.

What is claimed is:

1. A protective case comprises:
    a front case for a mobile device to be installed into comprising a first top, a first bottom, at least one fastening and a rail set at a bottom surface of the first bottom;
    a baffle comprising a convex rail matched with the rail set at the bottom surface of the first bottom and combined with the front case; and
    a baseplate for the front case to be installed into comprising a second top being sealed, a second bottom being unsealed, a sliding track respectively set at the second top and the second bottom, the front case combined with the baseplate through the at least one fastening put into and slid in the sliding track, the mobile device turned over with the front case.

2. The protective case as claimed in claim 1, wherein a first fastener is respectively set at a top surface of the first top and the bottom surface of the first bottom, at least one second fastener is respectively set at a bottom surface of the second top and a top surface of the second bottom, and the first fastener and the at least one second fastener are correspondingly engaged.

3. The protective case as claimed in claim 1, wherein the at least one fastening is a screw or a rivet.

4. The protective case as claimed in claim 3, wherein the screw is provided with a color, a pattern, an ornament, or the combination thereof.

5. The protective case as claimed in claim 1, wherein at least one side of the front case is provided with at least one first orifice.

6. The protective case as claimed in claim 1, wherein the baseplate is provided with a second orifice.

7. The protective case as claimed in claim 1, wherein the baffle is provided with a third orifice.

8. The protective case as claimed in claim 1, wherein the front case and the baseplate are provided with a color, a pattern, an ornament or the combination thereof.

9. The protective case as claimed in claim 2, wherein the first fastener is a protrusion, a dent or a magnet.

10. The protective case as claimed in claim 2, wherein the at least one second fastener is a protrusion, a dent or a magnet.

* * * * *